(12) United States Patent
Chan

(10) Patent No.: US 7,222,114 B1
(45) Date of Patent: May 22, 2007

(54) METHOD AND APPARATUS FOR RULE-BASED OPERATIONS

(75) Inventor: Vi Chi Chan, Toronto (CA)

(73) Assignee: Xilinx, Inc., San Jose, CA (US)

( * ) Notice: Subject to any disclaimer, the term of this patent is extended or adjusted under 35 U.S.C. 154(b) by 521 days.

(21) Appl. No.: 10/644,161

(22) Filed: Aug. 20, 2003

(51) Int. Cl.
*G06F 17/00* (2006.01)
*G06N 5/02* (2006.01)

(52) U.S. Cl. .............................. 706/47; 706/46; 706/14
(58) Field of Classification Search ................... 706/47, 706/46, 14; 716/5
See application file for complete search history.

(56) References Cited

U.S. PATENT DOCUMENTS

| | | | |
|---|---|---|---|
| 5,412,756 A | * | 5/1995 | Bauman et al. ............... 706/45 |
| 5,907,698 A | * | 5/1999 | Kucukcakar et al. .......... 716/6 |
| 6,754,763 B2 | * | 6/2004 | Lin ............................. 710/317 |
| 6,820,256 B2 | * | 11/2004 | Fleehart et al. ............. 717/155 |

OTHER PUBLICATIONS

David J. Kruglinski, Inside Visual C++, 1997, Microsoft Press, Fourth Edition, 5, 6, 7, 13, 131, 132.*
U.S. Appl. No. 10/090,256, filed Mar. 1, 2002, Eccles et al.

* cited by examiner

*Primary Examiner*—Joseph P Hirl
(74) *Attorney, Agent, or Firm*—Pablo Meles; LeRoy D. Maunu

(57) ABSTRACT

A method of a rule-based operation can include the steps of dividing a design rule into at least one of three components including an application criteria, a rule condition, and an action. The method can further include the steps of expressing the design rule as a datafile or source code and binding the three components together to form a rule object at runtime.

13 Claims, 4 Drawing Sheets

10

```
┌─────────────────────────────────────────┐
│ DIVIDE ANY DESIGN RULE INTO AT LEAST ONE OF │
│ THREE COMPONENTS COMPRISING AN APPLICATION  │
│ CRITERIA, A RULE CONDITION, AND AN ACTION   │
│                                         12  │
└─────────────────────────────────────────┘
                    │
                    ▼
┌─────────────────────────────────────────┐
│ EXPRESS A DESIGN RULE IN AT LEAST ONE AMONG │
│         A DATAFILE AND SOURCE CODE          │
│                                         14  │
└─────────────────────────────────────────┘
                    │
                    ▼
┌─────────────────────────────────────────┐
│      FORM A COMMON INTERFACE TO A RULE      │
│  CHECKER PROGRAM TO FORM AN INTERFACE       │
│       BETWEEN THE THREE COMPONENTS          │
│                                         16  │
└─────────────────────────────────────────┘
                    │
                    ▼
┌─────────────────────────────────────────┐
│  BIND THE THREE COMPONENTS TO FORM A RULE   │
│             OBJECT AT RUNTIME               │
│                                         17  │
└─────────────────────────────────────────┘
```

FIG. 1

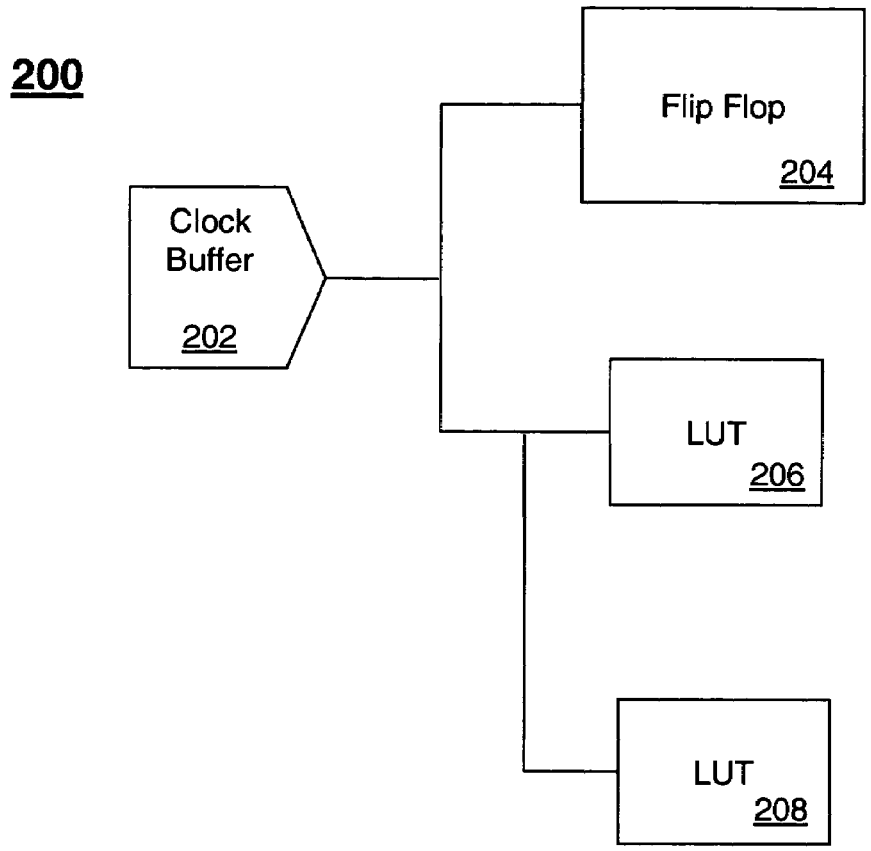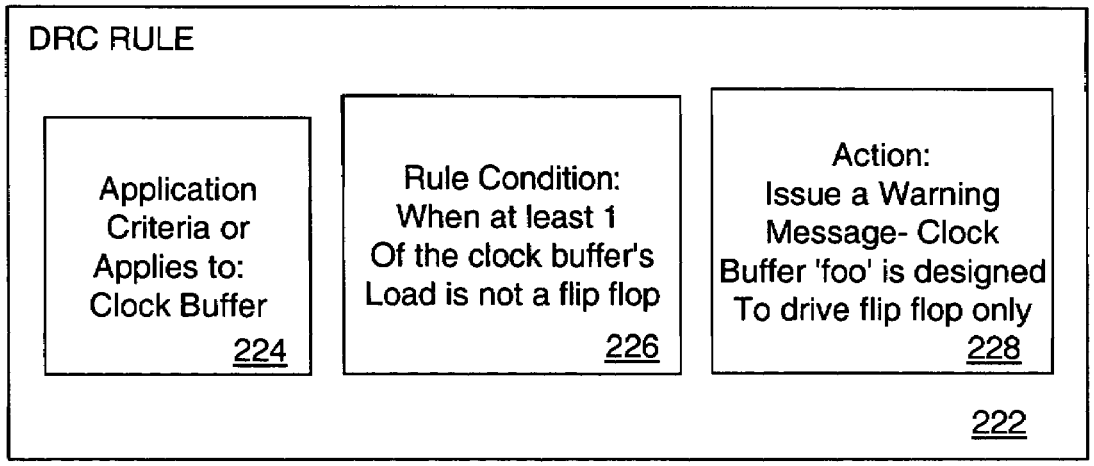
FIG. 4

METHOD AND APPARATUS FOR RULE-BASED OPERATIONS

BACKGROUND OF THE INVENTION

1. Technical Field

The present invention relates to the field of rule-based operations and, more particularly, to a data-driven design rule check (DRC) method and system.

2. Description of the Related Art

A logic simulator is a software tool which is capable of performing functional and timing simulations for digital electronic designs which are written in a hardware description language (HDL) such as VHSIC Hardware Description Language (VHDL) or Verilog. The VHSIC acronym stands for Very High Speed Integrated Circuits. VHDL and Verilog are HDLs used to design and document electronic systems. Verilog, for example, permits hardware designers to define signals at a very high level of abstraction. The abstracted signal representations can be translated to actual pins on a microchip using any of a variety of commercial electronic design automation (EDA) software tools.

Design Rule Check (DRC) is a crucial step in validating an electronic design before actual hardware implementation. A failed DRC signals a critical error which may lead to silicon failure. The goal of DRC is to identify places in the integrated circuit design where the design rules, such as the spacing between two features or the width of a wire, have been violated. Design rules tend to change frequently and with many different fabrication processes, particularly in the sub-micron domain, there could be many subtly different design rules. Thus, with design density growing and more hardware features being introduced, DRC is also growing in complexity. A typical new design block such as an embedded PowerPC in an field programmable gate array (FPGA)-based System-on-Chip (SOC) or a multi-Gigabit transceiver often requires a large number of complex design rule checks to be done.

In existing design rule checkers, the rules are often coded in software source code (e.g., C/C++) and then compiled into a software library. For example, in order to check whether Pin A of a component B is connected to a Ground signal, the following code fragment would be used:

```
function check_pinAofB(componentX)
{
  if(typeof(X)==B)
  {
    Pin pX =getpinA(X);
    if(driven_by_Ground(pX))
      issueError( );
  }
}
```

If a small change has to be made to the design rule above, the entire function (and hence the entire program file) must be recompiled. Such process is time-consuming and risky and hence makes rule modification difficult. Also, if other rules must be added to check the same condition for a different component, a large part of the above function/procedure must be replicated. Such a system is inflexible and hard to maintain.

SUMMARY OF THE INVENTION

Exemplary embodiments in accordance with the present invention can provide a method, system, and apparatus for dividing any design rule into at least 3 rule components, namely, an application criteria (or circumstances or "applies to") component, a rule condition component, and an action component. Such division of a design rule into 3 or more rule components enables the quick identification of which components are affected when a new rule or a rule change is introduced. The expression of design rules for any of the three components in such a system can be expressed in the form of a text datafile (such as XML format) and/or in the form of object oriented code. The system allows the use of a mixture of datafile and object code to express a design rule. Further note that the rules can be plugged-in and removed at runtime.

In one embodiment of the present invention, a method of a rule-based operation such as a design rule checker can include the steps of dividing a design rule into at least one of three components, the three components comprising, a design rule triggering criteria, a condition, and an action, wherein the action is responsive to an evaluation of the condition, expressing the design rule in at least one among a datafile and source code, and binding the three components together to form a rule object at runtime.

In another embodiment, method of forming a rule object can comprise the steps of reading rules from at least one among a library and a textual datafile and reading rules from at least one among a dynamic rule component library and a textual rule component datafile, and constructing component objects from at least one among the library and the textual datafile and from at least one among the dynamic rule object library and the textual rule component datafile. The method can further include the step of matching component objects having a same identifier and revision to form the rule object. The method can also include the step of binding the matching component objects that have a most recent version at runtime to form the rule object.

In another embodiment, a design rule checker program can include an application criteria component for determining when a rule is triggered, a rule condition component for determining how a positive response is tested for the rule, and an action component for determining the action taken to detection of the positive response. The program can further include a common object interface for interfacing with a rule object formed from the application criteria component, the rule condition component, and the action component at runtime. The program can also include a rule factory for building a rule repository for the design rule checker program from at least one among a datafile and program objects or code. The rule factory can search specified directories for user specified rule additions.

Another aspect of the present invention can include an embodiment in the form of a system or a machine readable storage, having a computer program having a plurality of code sections executable by a machine for causing the machine or system to perform the steps described in the methods above.

BRIEF DESCRIPTION OF THE DRAWINGS

There are shown in the drawings embodiments which are presently preferred, it being understood, however, that the invention is not so limited to the precise arrangements and instrumentalities shown.

FIG. 1 is a flow chart of a method of design rule checking in accordance with the present invention.

FIG. 4 is a block diagram of a circuit and DRC example useful in understanding a design rule checker in accordance with the present invention.

DETAILED DESCRIPTION OF THE INVENTION

Figure 2:
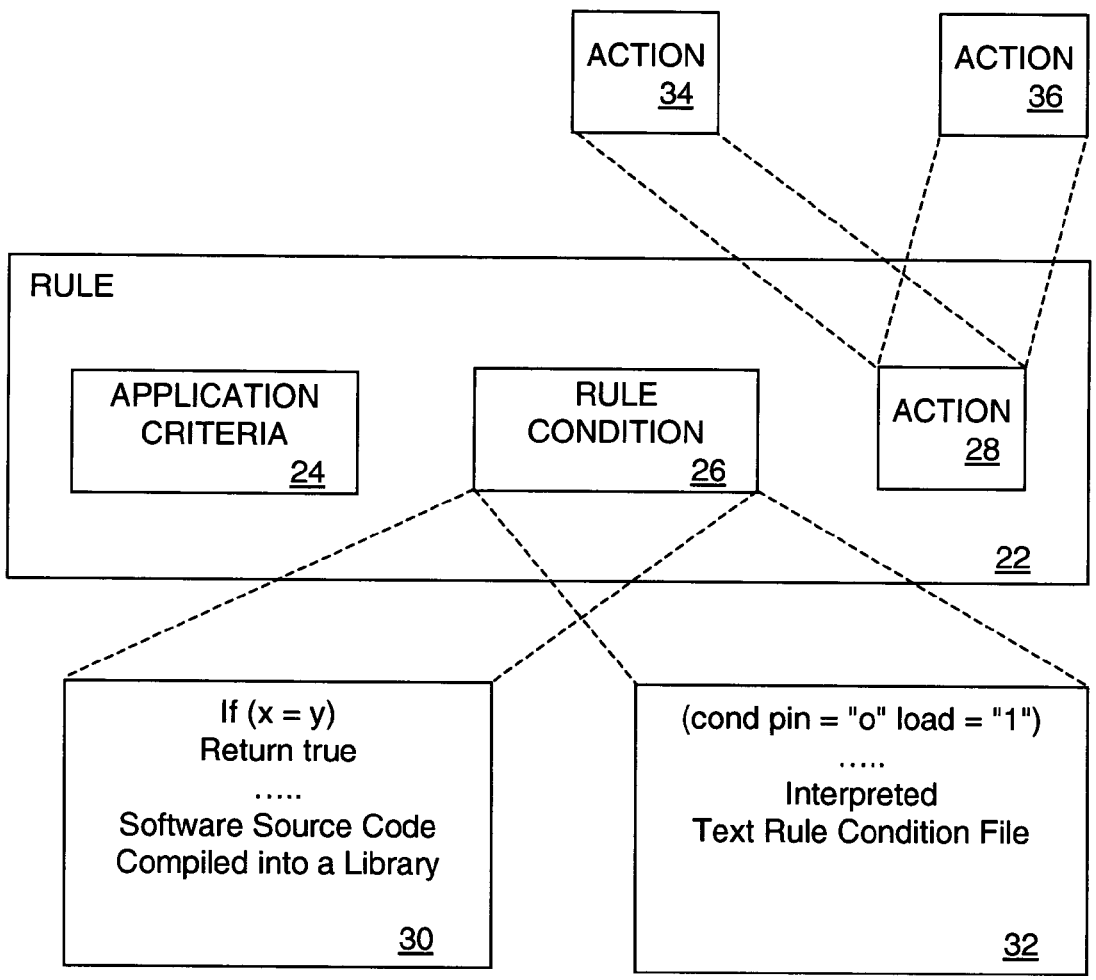
FIG. 2 is a block diagram illustrating the flexibility and expandability of the a design rule checker in accordance with the present invention.

Embodiments in accordance with the present invention provide a method, system, and apparatus for rule-based operation such as design rule checking. As shown in FIG. 1, a rule-based operation or method 10 can be divided into three major components at step 12. The first component can be an application criteria (or circumstances) component that will determine under what situation a particular rule will be triggered. For example, a particular rule can be applied while assembling components in a modular design flow. The second component can be a rule condition component that is tested for a positive or true value. For example, "if Pin X is driven by a constant signal" is a rule condition, which when true, triggers some action to be taken. Finally, the third component is an action component that determines what action to take when a positive (or true) rule-condition is detected. For example, the action can be issuing an "ERROR" message to a user.

The prior art example given above, has these three components. The activation criteria is "if (typeof(x)==B)". The rule condition is "if (driven_by_Ground(pX))". And the action is "issueError( )". However, these three "sub"-components in the prior art are all in one complied function: "function check_pinAofB(componentX)", i.e., are inseparably part of a bigger component. Thus an exemplary embodiment of the present invention, separates each of the three "sub"-components into its own stand-alone component. For example, rather than having one design rule function or object having the three "sub"-components, there are three separate functions or objects, such as an application criteria object, a rule condition object, and an action object, where the objects may be complied into a library. There also could be three groups of ASCII text, each stored in its own datafile or there can be a combination of complied objects and text in datafiles.

By separating a rule into the three or more components as described above, the implementation of a design rule checker becomes more flexible. Each of the components can be implemented by different means. In other words, a design rule can be expressed in at least one among a datafile or program source code as shown at step 14. A datafile may, for example, contain ASCII text of extensible Markup Language (XML) statements, which will be read by a browser program. The program source code may be in C/C++, JAVA, VB/VBA, or another computer language. For example, a design rule which should only be triggered during a technology mapping stage using Xilinx's Virtex-II FPGA architecture on a component called MUXCY can have the application criteria implemented by a datafile having an XML element as follows:

<applies-to stage="MAP" arch="Virtex2" BLOCK="TRUE" TYPE="MUXCY"/> or the same application criteria can be rewritten in the form of an object in software object oriented source code as follows:

class MuxcyRuleApplies {
  bool match(Block* b);

} bool MuxcyRuleApplies::match(Block* b)

{
  if(is arch("Virtex2")&& is_stage("Map"))
  return (b->is Type("MUXCY"));
  else
  return false;

}

The benefit of this flexibility in being able to use a text datafile having the XML or the object oriented source code is that the user can choose the best implementation for each individual component. For example, a user can implement the Application Criteria in XML in a datafile, the Rule Conditions in source code and the Rule Action in XML in a datafile. This flexibility also enables easy changes to any of the components or the ability to reuse them for new design rules.

At step 16, a common interface to the rule checker program can be formed to provide an interface between the three components and the rule checker program. The common interface is both a link between the unique rule object formed and the rules constructed and stored in a database and also serves as a real "interface" that describes methods that can be called. For example, all Rule Condition objects can implement the method "check( )" and all Application Criteria objects can implement the method "match( )". The interface also describes a relationship, e.g. all Rule objects have pointers to an Application Criteria object, a Rule condition object and an Action object.

At step 17, the three components are bound together to form a rule object at runtime. This rule object is a program object that has the common interface to the rule checker program. By having a common interface to the rule checker program, the implementation details of the rules are further hidden from the design rule checker program. In other words, the rule checker program does not care how the rules are necessarily implemented.

The common interface between components creates a significant advantage for this system, namely the runtime plug-in of rules. A new design rule or a change to one or more components in an existing design rule can be entered at runtime using the runtime plug-in without having to recompile all of the program code for the design rule checker. The client (i.e., the person or tools desiring to perform the DRC such as a logical tool or a designer who wants to write a program to perform their specific checks on a design) of rules only cares about the common interface. The client of rules only invokes the rules by the common interface, and does not care about how specific rules are implemented. A rule factory is used in the beginning of the process to build all the rules out of a data file and/or program objects (or code) as will be further described below with respect to FIG. 3. Any new rule addition or changes can be made at run-time. The rule factory in this instance will search specific directories for user specific rule additions. The rules, expressed in the three (or more) components, can then be built by the rule factory and added to the rule repository. Once a rule is built and added, the rule behaves just like any other rules in the design rule checker system. The runtime plug-in system allows quick rule additions and changes at a customer site without the need to ship a compiled library to the customer. This plug-in system also allows rapid deployment of design rules during the prototyping process.

The clear division of components in a rule-based operation like a design rule checker disclosed above enables such a system to be easily maintained in a clearly defined manner. The use of a common interface for the separate components additionally makes such a system independent of the implementation method used. Thus, the specification and introduction of new rules at runtime are achieved without additional concerns regarding compatibility. Finally, using an interpreted datafile to store rule components also makes pre-compilation of rules in the software source code unnecessary.

Referring to a design rule checker system 20 of FIG. 2, a rule 22 can be divided into three components including an Application Criteria 24, a Rule Condition 26, and an Action 28. As shown, different components can be mixed and matched to create new rules and provide greater flexibility and reusability. For example, Action component 34 can easily be replaced for Action component 36. As previously noted and illustrated by Rule Condition components 30 and 32, any rule component can be expressed in alternative fashion as either source code (30) or as a datafile (32). When the rule condition is source code 30, this source code can be complied into object code and stored in a library (or database). During run time rule 22 accesses this object code in the library for the rule condition 26. When the rule condition is a text rule file, i.e., datafile 32, rule condition 22 is interpreted at run-time to evaluate the text rule condition (cond pin="o" load="1") to determine if it is positive or true.

Figure 3:
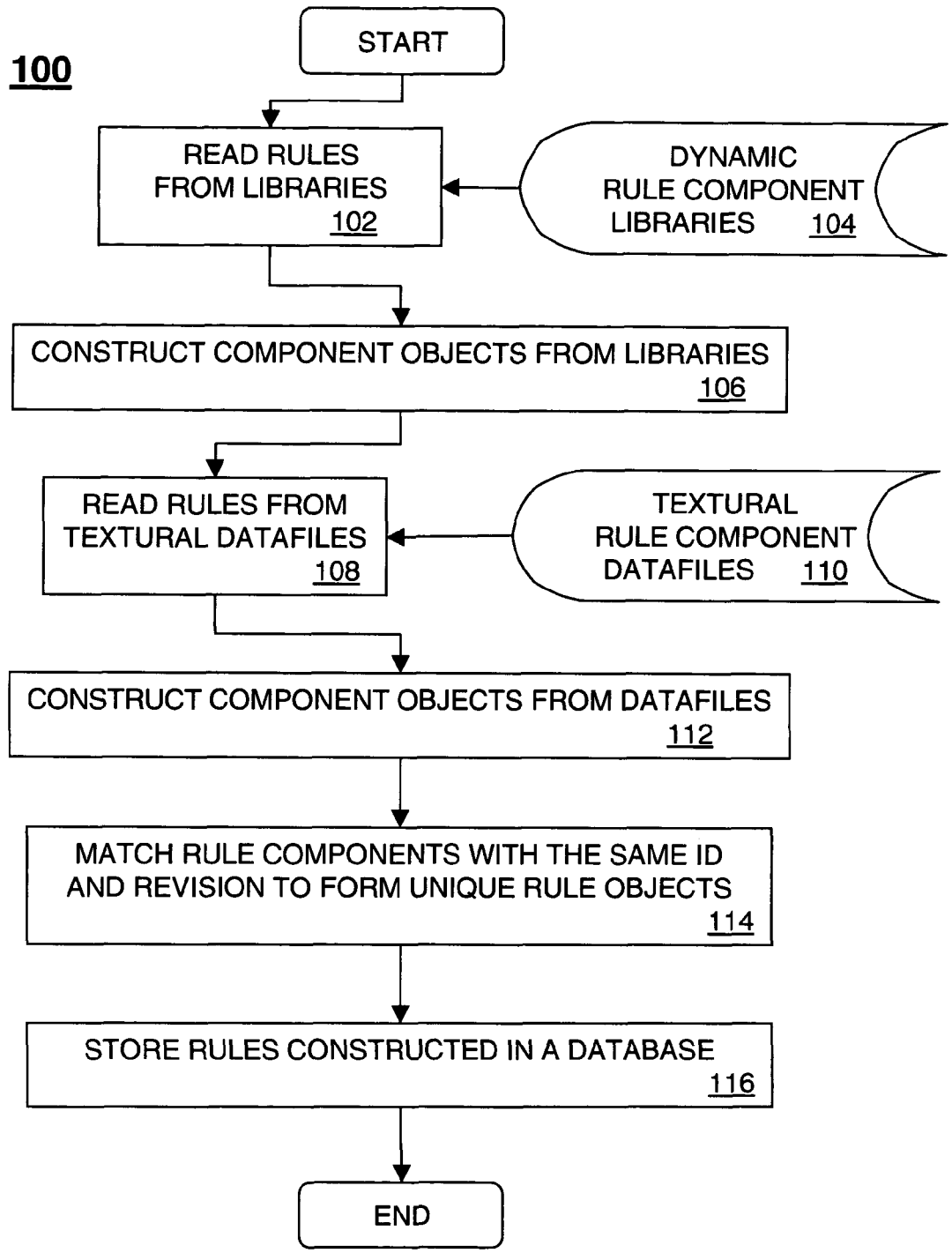
FIG. 3 is a flow chart of a method of forming a rule object using a rule factory in accordance with the present invention.

Referring to FIG. 3, a flow chart illustrates a method 100 of forming a rule object. The method 100 can include the steps of reading rules from at least one among a library at step 102 and a textual datafile at step 108 and reading rules from at least one among a dynamic rule component library at step 104 and a textual rule component datafile at step 110. In other words, rules can be read from libraries already existing at step 102 and dynamic rule component libraries can also be read in as "plug-ins" at runtime at step 104. Likewise, rules can be read from textual datafiles already in existence at step 108 and textual rule component datafiles can be read in as plug-ins at runtime at step 110. Component objects can be constructed from at least one among the library and the textual datafile and from at least one among the dynamic rule object library and the textual rule component datafile at steps 106 and 112 accordingly. The method 100 further matches component objects having a same identifier and revision or version to form the rule object at step 114. The rule object formed is unique. The step of matching can comprise the step of binding the matching component objects that have a most recent version at runtime to form the rule object. The rules that are constructed can then be stored in a database at step 116.

Referring to FIG. 4, a block diagram of a simple proposed circuit design 200 subject to a design rule check using rule 222 in accordance with an embodiment of the present invention is shown. The circuit 200 illustrates a clock buffer 200 having a flip flop 204 and look up tables (LUTs) 206 and 208 as loads. The DRC rule 222 has an Application Criteria 224 that applies to a clock buffer, a Rule Condition 226 that requires consideration when at least one of the clock buffer's load is not a flip flop, and an Action 228 the issues a warning message such as "Clock Buffer 'foo' is designed to drive flip flop only."

With further reference to FIG. 4, the flexibility of rule component reuse in accordance with an embodiment of the invention is clearly demonstrated when any one of the rule components needs changing. A designer only has to add a new rule with a modified component with the remaining components left unchanged. For example, if a new clock buffer is added to the design 200, the designer only has to add a new rule with a modified Application Criteria component or "Applies to" component while leaving the remaining components unchanged. Additionally, the flexibility and advantages of being able to use datafiles or program code in implementation can also clearly be demonstrated with reference FIG. 4. For example, if any particular rule component becomes too complicated to be expressed in data or datafile form (e.g., the Rule Condition 226 is changed to: "If the percentage of non-Flip Flop loads exceeds 50%"), then the rule component can be implemented in program code. Thus, any system incorporating the concepts herein is not limited to the datafile syntax or representation in implementation.

An embodiment of the present invention can be realized in hardware, software, or a combination of hardware and software. The embodiment can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

An embodiment of the present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Notably, the concepts discussed herein can be applied to other rule-based operations in design software. For example, systems for performing circuit optimization or circuit transformation triggered by certain circuit topologies can be coded into similar categories such as Application Criteria, Condition, and Action. Again, these other rule-based operations can be expressed or implemented either using textual datafiles or program object code. Accordingly, reference should be made to the following claims, rather than to the foregoing specification, as indicating the scope of the invention.

What is claimed is:

1. A processor-implemented method of generating design rules for use in validating an electronic design, comprising the steps of:

establishing for each of a plurality of design rules for the electronic circuit design, a respective set of first, second, and third components;

wherein application of a design rule determines whether the electronic circuit design satisfies a requirement specified by the design rule;

wherein the first component of a design rule specifies triggering criteria that specify whether the design rule is applicable to the electronic design, the second component of the design rule specifies a condition, and the third component of the design rule specifies an action performed in response to the design rule being applicable based on the triggering criteria of the first component and the condition of the second component being satisfied;

wherein for each first, second, and third components of the plurality of design rules, the component is one of a datafile and source code, and the first, second, and third components are separate files;

for each first, second, and third component specified as a datafile, storing the datafile in a database;

for each first, second, and third component specified as source code, compiling the source code into object code; and binding each set of first, second, and third components together to form a rule object at runtime.

2. The method of claim 1, further comprising, entering at least one among a new design rule and a change to an existing design rule at runtime using a runtime plug-in, wherein the step of entering is done without compiling.

3. The method of claim 2, wherein the step of entering at least one among the new design rule and the change to the existing design rule comprises the step of changing at least a portion of one component.

4. The method of claim 1, wherein the method further comprises forming a common object interface to a rule checker program to form an interface between the three components.

5. The method of claim 1, wherein the datafile includes an XML statement and the source code includes a C or C++ instruction.

6. A machine readable storage, having stored thereon a computer program having a plurality of code sections executable by a machine for causing the machine to perform the steps of:

establishing for each of a plurality of design rules for the electronic circuit design, a respective set of first, second, and third components;

wherein application of a design rule determines whether the electronic circuit design satisfies a requirement specified by the design rule;

wherein the first component of a design rule specifies triggering criteria that specify whether the design rule is applicable to the electronic design, the second component of the design rule specifies a condition, and the third component of the design rule specifies an action performed in response to the design rule being applicable based on the triggering criteria of the first component and the condition of the second component being satisfied;

wherein for each first, second, and third components of the plurality of design rules, the component is one of a datafile and source code, and the first, second, and third components are separate files;

for each first, second, and third component specified as a datafile, storing the datafile in a database;

for each first, second, and third component specified as source code, compiling the source code into object code; and binding each set of first, second, and third components together to form a rule object at runtime.

7. The machine readable storage of claim 6, wherein said step of binding is done without compiling.

8. The machine readable storage of claim 6, wherein the plurality of code sections further cause a machine to form a common object interface to a rule checker program to form an interface between the three components.

9. A apparatus for generating design rules for use in validating an electronic design, comprising:

means for establishing for each of a plurality of design rules for the electronic circuit design, a respective set of first, second, and third components;

wherein application of a design rule determines whether the electronic circuit design satisfies a requirement specified by the design rule;

wherein the first component of a design rule specifies triggering criteria that specify whether the design rule is applicable to the electronic design, the second component of the design rule specifies a condition, and the third component of the design rule specifies an action performed in response to the design rule being applicable based on the triggering criteria of the first component and the condition of the second component being satisfied;

wherein for each first, second, and third components of the plurality of design rules, the component is one of a datafile and source code, and the first, second, and third components are separate files;

means, responsive to each first, second, and third component specified as a datafile, for storing the datafile in a database;

means, responsive to each first, second, and third component specified as source code, for compiling the source code into object code; and means for binding each set of first, second, and third components together to form a rule object at runtime.

10. The apparatus of claim 9, further comprising means for entering at least one among a new design rule and a change to an existing design rule at runtime using a runtime plug-in.

11. The apparatus of claim 9, further comprising means for interfacing with a rule object formed from the first component, the second component, and the third component at runtime.

12. The apparatus of claim 9, further comprising means for building a rule repository from at least one among a datafile and program objects.

13. The apparatus of claim 12, further comprising means for searching for specified directories for user specified rule additions.

* * * * *